United States Patent [19]
Kim et al.

[11] Patent Number: 5,988,853
[45] Date of Patent: Nov. 23, 1999

[54] METHOD FOR PLACING NAMES FOR POINT-FEATURES ON A MAP BASED ON A PLANE SWEEPING TECHNIQUE

[75] Inventors: Jang Su Kim; Kyeong Hee Oh; Kyung Eun Park; Jong Won Lee, all of Seoul, Rep. of Korea

[73] Assignee: Korea Telecom, Seoul, Rep. of Korea

[21] Appl. No.: 08/943,596

[22] Filed: Oct. 3, 1997

[30] Foreign Application Priority Data

Oct. 5, 1996 [KR] Rep. of Korea ................. 96-44143

[51] Int. Cl.⁶ ...................................................... G06F 17/00
[52] U.S. Cl. ........................ 364/400; 701/200; 701/201; 701/208; 707/10
[58] Field of Search ........................... 364/400; 701/200, 701/201, 208; 707/10; 382/472.02

[56] References Cited

U.S. PATENT DOCUMENTS

| | | | |
|---|---|---|---|
| 4,519,041 | 5/1985 | Fant et al. | 382/472.02 |
| 5,774,362 | 6/1998 | Suzuki et al. | 701/208 |
| 5,819,199 | 10/1998 | Kawai et al. | 701/200 |
| 5,835,907 | 11/1998 | Newman | 707/10 |
| 5,839,088 | 11/1998 | Hancock et al. | 701/201 |

*Primary Examiner*—William Grant
*Assistant Examiner*—McDieunel Marc
*Attorney, Agent, or Firm*—Staas & Halsey

[57] ABSTRACT

In an automatic mapping system, a plurality of names are placed on a map in association with a plurality of corresponding point-features with minimized overlapping among the names. First a minimum bounding rectangle (MBR) is placed on a predetermined position of a target point located on a predetermined direction-uppermost position from point-features, where the MBR is selected for representing a name corresponding to the target point. Next, it is determined whether the MBR is overlapped with at least one of previously assigned MBRs and if the MBR is not overlapped with any of the previously assigned MBRs, the current position of the MBR is determined and the name is placed on the MBR. If the MBR is overlapped with at least one of the previously assigned MBRs, it is determined whether it is possible to continuously shift the MBR around the target point so that the MBR located on one of shifted positions is not overlapped with any of the previously assigned MBRs and, if possible, the MBR is located on the shifted position and the name is placed on the MBR. Another point-feature is assigned and located on a predetermined direction-uppermost position from the remaining point-features as a target point and the above steps are repeated until all of the point features contained on the map are processed.

10 Claims, 4 Drawing Sheets

METHOD FOR PLACING NAMES FOR POINT-FEATURES ON A MAP BASED ON A PLANE SWEEPING TECHNIQUE

FIELD OF THE INVENTION

The present invention relates to an automatic mapping field and, more particularly, to a method for use in a geographic information system for effectively placing a plurality of names and a plurality of corresponding point-features on a map with minimized overlapping among them.

DESCRIPTION OF THE PRIOR ART

A geographic information system (GIS) generally employs an apparatus, such as a computer, for automatically producing a geographic map. In GIS, a certain region of a map can be displayed on a display device, e.g., a screen, a print or the like, with spatial features and their names which are denoted by using alphanumeric characters.

The map is a collection of the features and the names thereof which represent geographical regions. The features are represented by graphical symbols, e.g., points, lines, or areas, and are related to their physical counterparts. That is, the point-features are point-objects in the geographic sense. They also denote small objects which are so small that it is difficult to place names with them. The line-features are linear or ribbon-like objects to denote roads and rivers. The area-features may have an explicit boundary, as for lakes and islands, or may not have a boundary, as for the valleys or mountains. A map feature is varied based on the scale of the map. That is, an area-feature at one scale may be represented by a line- or point-feature at a smaller scale. The names on a map identify and classify such features.

A may labeling is to position a plurality of names on a map so that they are clearly associated with corresponding features contained in the map. In the map labeling, it is necessary to automatically decide a position of the name for each feature and locate the names on the map. In this case, it is required that there be no overlap among names or between the names and the corresponding features to thereby allow users to perceive the names precisely. Furthermore, the map labeling also has to conform to established cartographic conventions in order to achieve a high level of aesthetic quality.

Several approaches have been proposed to solve the above problems, wherein, although three automatic map labeling processes are performed for point-, line-, and area-features, respectively, theses approaches are addressed to the point-feature labeling (PFL) without loss of generality. One of the several approaches is disclosed in an article by C. Jones, "Cartographic Name Placement with Prolog", *IEEE Computer Graphics & Applications*, 9(5), pp. 36–47(1989), which includes a rule-based system employing a rule data base and a rule processor. The rule data base contains a set of complex rules for placing names and measuring the placement quality, wherein the rules are determined by using a method which is known to the skilled cartographier based on a variety of cartographic situations. The rule processor determines the order of the features to which the corresponding names will be labeled by classification of the features. However, since numerous cartographic rules should be obtained by the skilled cartographer and implemented in the rule data base, this system may be merely used for establishing a huge expert system.

Other approaches are described in articles by M. Formann et al., "A Packing Problem of Placing Names in a Geographic Map", *Proceeding 7th Annular ACM Symposium Computer Geometry*, pp. 281–288 (1991); S. Zoraster, "Integer Programming Applied to the Map Label Placement Probelm", *Cartographica*, 23(3), pp. 16–27 (1986); and S. Hirasch, "An Algorithm for Automatic Name Placement Around Point data", *The American Cartographer*, 9(1), pp. 5–15(1982), which contain combinatorial optimization techniques using a search space and an object function. In the combinatorial optimization techniques, for each point-feature, a set of possible label positions, e.g., 8, for a corresponding name are pre-selected. One of the possible label positions for a target point-feature is selected mathematically based on the objective function. Substantially, the simplest and easy-to-compute objective function is to minimize the number of point-features to be labeled with overlapped names. However, since, as described in the above articles, the point-feature labeling problem with the simplest object function and its variant problem is NP-hard, it is difficult to implement these techniques in a practical system for automatically producing a geographic map.

Another approach employing the combinatorial optimization technique is taught in an article by J. Christensen et al., "An Empirical Study of Algorithms for Point-Feature Label Placement", *ACM Transaction on Graphics*, 14(3), pp. 203–232 (1995), which contains a simulated annealing technique. In the simulated annealing technique, for each point feature, a corresponding label or name is placed on any of the pre-selected available potential positions. The previously placed labels or names are stochastically respositioned until the rate of improvement of object function falls below a given threshold. Although the stochastic reposition of the simulated annealing technique allows the ability to jump out of a local minima problem and can be implemented in the practical point labeling system, the repetitive stochastic reposition is still a time consuming method. Therefore, it may be necessary to provide a heuristic method which gives a good response time and a better solution for the map labeling than the prior art method.

SUMMARY OF THE INVENTION

It is, therefore, a primary object of the present invention to provide a method, for use in a geographic information system, for effectively placing a plurality of names and a plurality of corresponding point-features on map with minimized overlapping among them and a reduced response time.

In accordance with the present invention, there is provided a method, for use in an automatic mapping system, for placing a plurality of names on a map in association with a plurality of corresponding point-features with minimized overlapping among the names, which comprises the steps of: (a) arranging the point-features based on x-y coordinate data; (b) selecting a point feature located on a predetermined direction-uppermost position from the point-features as a target point; (c) placing a minimum bounding rectangle (MBR) on a predetermined position of the target point, wherein the MBR is selected for representing a name corresponding to the target point; (d) determining, whether the MBR is overlapped with at least one of the previously assigned MBRs; (e) if the MBR is overlapped with none of the previously assigned MBRs locating the MBR and current position of the MBR and placing the name on the MBR; (f) if the MBR is overlapped with at lest one of the previously assigned MBR, determining whether it is possible to continuously shift the MBR around the target point so that the MBR located on one of shifted positions is overlapped with none of the previously assigned MBRs; (g) if possible, locating the MBR on said one and placing the name on the MBR; and (h) assigning another point feature located on a predetermined direction-uppermost position from the remaining point-features as a target point and repeating the steps of (c) to (h) until all of the point features contained the map are processed.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
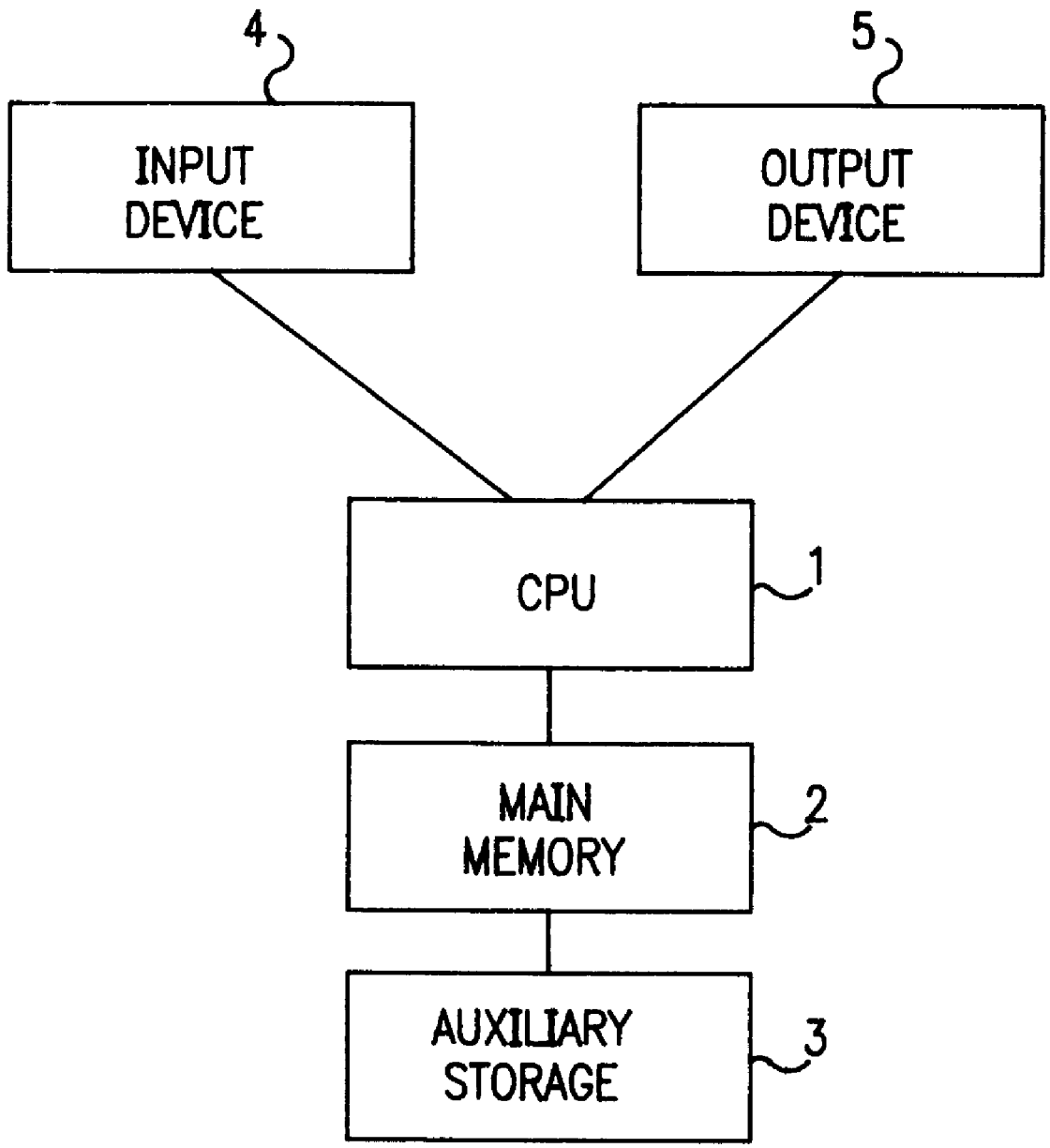
FIG. 1 represents a schematic block diagram of an automatic map producing apparatus for a geographic information system employing a plane sweeping technique in accordance with the present invention.
Figure 2:
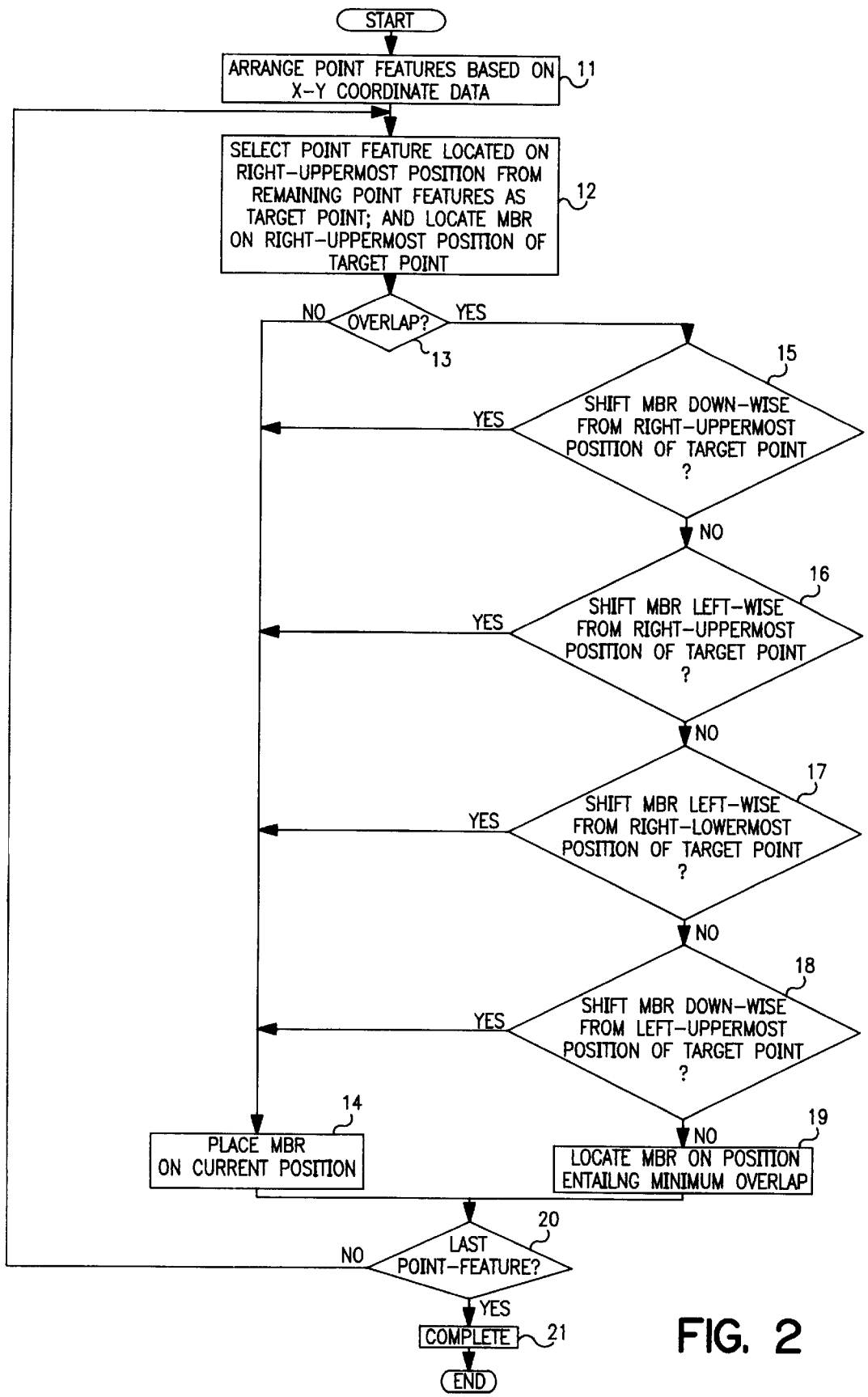
FIG. 2 shows a flow chart of the plane sweeping algorithm in accordance with the present invention.

Referring to FIG. 1, there is shown an automatic map producing apparatus employing a plane sweeping method in accordance with the present invention. The automatic map producing apparatus includes a central processing unit (CPU) 1, a main memory 2, an auxiliary storage 3, an input device 4, and an output device 5.

As shown, geographic information, which includes point-feature position information, is coupled via the input device 4 and the CPU 1 to the auxiliary storage 3 which stores the geographic information. The input device is provided with a digitizer, a key board, a pointing device such as a mouse, and the like. The CPU 1 retrieves the stored geographic information from the auxiliary storage 3 and processes the geographical information, as will be described hereinafter, by using the plane sweeping algorithm in accordance with the present invention to generate processed geographic information having labeled point-feature information. The labeled point-feature information is then relayed to the main memory 3 and, upon a user request through the input device 4, is provided to the output device 5 which includes a monitor, a printer, plotter and the like.

Referring to FIGS. 2 and 3A to 3E, there are illustrated a flow chart and explanatory diagrams of the plane sweeping algorithm in accordance with the present invention. As described above, the plane sweeping algorithm can be implemented by software in the automatic map producing apparatus shown in FIG. 1.

After the start step, at step 11, the point-features are sequentially retrieved from the auxiliary storage 3 and arranged based on the corresponding position information, e.g., x-y coordinate data.

At step 12, a point-feature of un-processed point feature, which is located on the right-uppermost position, is assigned as a target point and then a minimum bounding rectangle (MBR) corresponding thereto is placed on a predetermined position, e.g., a right-uppermost position of the target point.

Figure 3A:
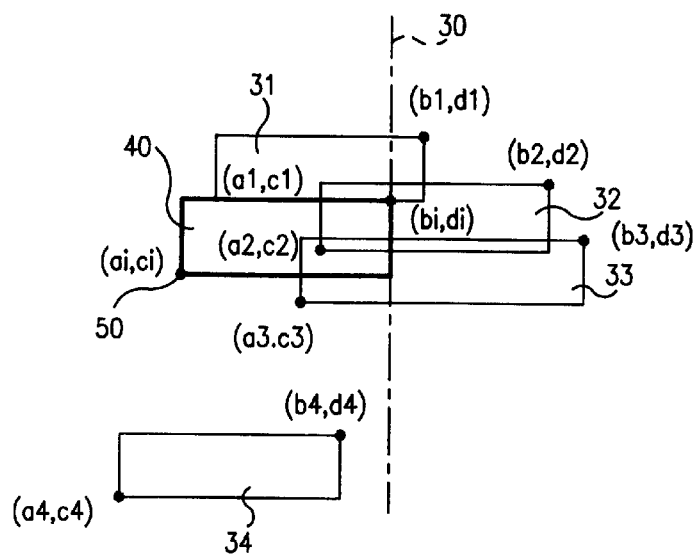
FIGS. 3A to 3E illustrate explanatory diagrams showing the plane sweeping algorithm of the present invention.

As shown in FIG. 3A, the MBR 40 is selected for representing a name corresponding to the target point 50 and represented by using two points located on the leftmost and rightmost positions, e.g., $[a_i,b_i] \times [c_i,d_i]$. Thereafter, the x-coordinate of an initial sweep line 30 is set to $b_i$ so that an initial sweep-line status includes three vertical intervals $[c_1,d_1],[c_2,d_2]$ and $[c_3,d_3]$ of previously assigned minimum bounding rectangles 31, 32, and 33 intersecting the sweep line 30. In this case, the sweep line is located on a vertical line through the right-side of the MBR and the sweep-line status describes the intersection of the sweep-line 30 with previously assigned MBRs 31, 32 and 33.

At step 13, the process determines, based on the status of the MBR and the initial sweep-line status, whether the MBR is overlapped with one of the previously assigned MBRs.

When the MBR is overlapped with none of the previously assigned MBRs, the process goes to step 14. That is, in this case, the status of the MBR, e.g., the current vertical interval $[c_i,d_i]$ shown in FIG. 3A, is overlapped with none of intervals contained in the sweep-line status, e.g., $[c_1,d_1]$, $[c_2,d_2]$ and $[c_3,d_3]$ shown in FIG. 3A. At step 14, the MBR is set to the current position and then process goes to step 20.

When the MBR is overlapped with at least one of the previously assigned MBRs, the process performs step 15. That is, in this case, the status of the MBR, e.g., the current vertical interval $[c_i,d_i]$ shown in FIG. 3A, is overlapped with at least one of vertical intervals contained in the sweep-line status, e.g., $[c_1,d_1],[c_2,d_2]$ and $[c_3,d_3]$ shown in FIG. 3A. The process goes to step 15.

Figure 3B:
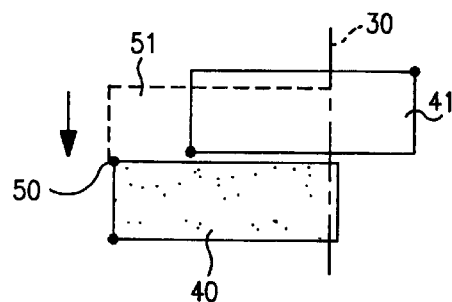

At step 15, the process determines whether it is possible to shift the MBR downward from the right-uppermost position of the target point, e.g., 51 shown in FIG. 3B, so that shifted vertical interval thereof is overlapped with none of intervals contained in the sweep-line status. If so, as shown in FIG. 3B, the process assigns a newly selected position represented by the shifted intervals of the MBR as a current position and goes to step 14. If not, the process goes to step 16.

Figure 3C:
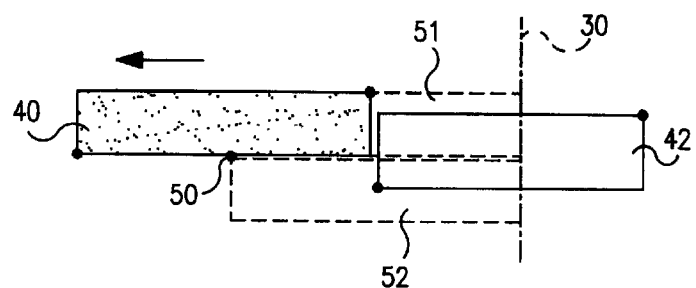

At step 16, the process determines whether it is possible to shift the MBR left-wise from the right-uppermost position of the target point 51 shown in FIG. 3C, so that shifted vertical interval thereof is overlapped with none of intervals contained in the sweep-line status. If so, as shown in FIG. 3C, the process assigns a newly selected position represented by the shifted intervals of the MBR as the current position and goes to step 14. If not, the process goes to step 17.

Figure 3D:
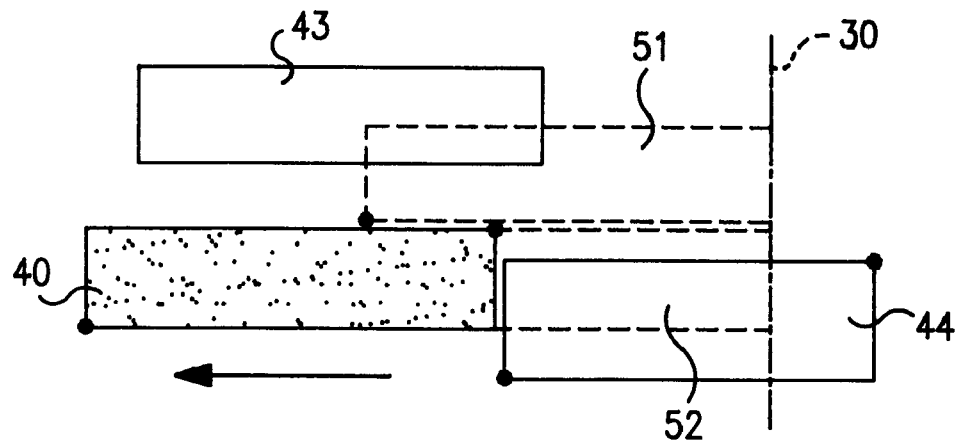

At step 17, the process determines whether it is possible to shift the MBR left-wise from right-lowermost position of the target point 52 shown in FIG. 3D, so that shifted vertical interval thereof is overlapped with none of intervals contained in the sweep-line status. If so, as shown in FIG. 3D, the process assigns a newly selected position represented by the shifted intervals of the MBR as the current position and goes to step 14. If not, the process goes to step 18.

Figure 3E:
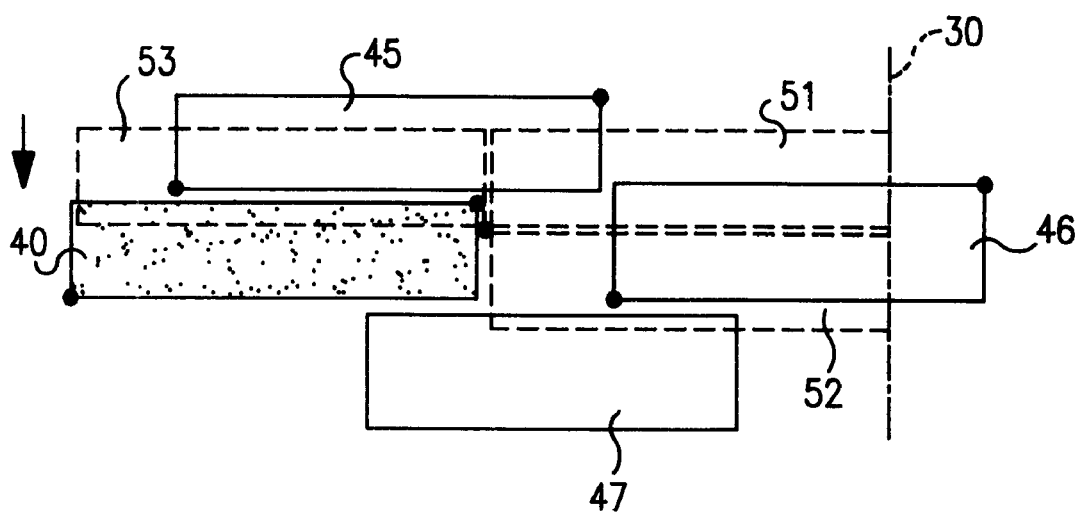

At step 18, the process determines whether it is possible to shift the MBR downward from left-lowermost position of the target point, 53 shown in FIG. 3E, so that shifted vertical interval thereof is overlapped with none of intervals contained in the sweep-line status. If so, as shown in FIG. 3E, the process assigns a newly selected position represented by the shifted intervals of the MBR as the current position and goes to step 14. If not, the process goes to step 19.

At step 19, the MBR is located on a position in which an overlapping region between the MBR and one of the previously assigned MBRs can be minimized. Thereafter, the process goes to step 20.

At step 20, the process determines whether the target point-feature is the last point-feature. If not, the process returns to step 12 and, as a result, the steps 12 to 20 are repeated until all of the point-features contained the map are processed. If so, at step 21, the process is completed and terminated.

As demonstrated above, in the present invention, it is readily appreciated that an MBR for a target point can be adaptively positioned about the target point based on the sweep-line status to thereby effectively reduce the number of overlapped names. Furthermore, a name for each point feature can be sequentially positioned without a repetitive process to thereby effectively reduce the response time of the inventive system.

While the present invention has been shown and described with reference to the particular embodiments, it will be apparent to those skilled in the art that many changes and modifications may be made without departing from the spirit and scope of the invention as defined in the appended claims.

What is claimed is:

1. A method, for use in an automatic mapping system, for placing a plurality of names on a map in association with a plurality of corresponding point-features with minimized overlapping among the names, comprising the steps of:

(a) arranging the point-features based on x-y coordinate data on the map;

(b) selecting one of the point features located at a predetermined uppermost position from the point-features as a target point;

(c) placing a minimum bounding rectangle (MBR) on a predetermined position of the target point, wherein the MBR is selected to represent a name corresponding to the target point;

(d) determining whether the MBR is overlapped with at least one of a plurality of previously assigned MBRs;

(e) locating the MBR and a current position of the MBR and placing the name on the MBR if the MBR is not overlapped with any of the previously assigned MBRs;

(f) determining whether it is possible to continuously shift the MBR around the target point to locate the MBR on one of a plurality of shifted positions not overlapped with any of the previously assigned MBRs if the MBR is overlapped with at least one of the previously assigned MBRs;

(g) locating the MBR on the one of said plurality of shifted positions not overlapped with any of the previously assigned MBRs and placing the name on the MBR; and (h) assigning another point feature located on a new predetermined uppermost position from the remaining point-features as the target point and repeating the steps (c) to (h) until all of the point features contained on the map are processed.

2. The method as recited in claim 1, wherein the predetermined position is a right-uppermost position of the target point and the step (f) includes a step of determining whether it is possible to continuously shift the MBR downward from the right-uppermost position of the target point so that the MBR located on one of the plurality of shifted positions is not overlapped with any of the previously assigned MBRs.

3. The method as recited in claim 2, wherein the step (f) includes a step of determining whether it is possible to continuously shift the MBR left-wise from the right-uppermost position of the target point so that the MBR located on one of the plurality of shifted positions is not overlapped with any of the previously assigned MBRs.

4. The method as recited in claim 3, wherein the step (f) includes a step of determining whether it is possible to continuously shift the MBR left-wise from the right-lowermost position of the target point so that the MBR located on one of the plurality of shifted positions is not overlapped with any of the previously assigned MBRs.

5. The method as recited in claim 4, wherein the step (f) includes a step of determining whether it is possible to continuously shift the MBR downward from the left-uppermost position of the target point so that the MBR located on one of the plurality of shifted positions is not overlapped with any of the previously assigned MBRs.

6. The method as recited in claim 5, further comprising a step g' performed between the steps (g) and (f), the step g' comprising placing the MBR on a position which results in a minimum overlapping with the previously assigned MBRs and locating the name on the MBR.

7. The method as recited in claim 6, wherein the step (c) includes a step of setting a sweep line and a sweep-line status, wherein the sweep line is located through a right-side of the MBR and the sweep-line status describes an intersection of the sweep-line with previously assigned MBRs.

8. The method as recited in claim 7, wherein a position of the MBR is represented by using x-y coordinates of right-uppermost and left-lowermost positions of the MBR and the sweep-line status includes a vertical interval of each of the previously assigned MBRs intersecting the sweep line, wherein the vertical interval is represented by y-coordinates of two right-uppermost and left-lowermost positions for said each of the previously assigned MBRs intersecting the sweep line.

9. The method as recited in claim 8, wherein the determination of whether the MBR is overlapped with at least one of the previously assigned MBRs is performed based on the position of the MBR and the sweep-line status.

10. A method, for use in an automatic mapping system, for placing a plurality of names on a map in association with a plurality of corresponding point-features arranged on the map with minimized overlapping among the names, comprising the steps of:

(a) selecting one of the point features as a target point and placing a minimum bounding rectangle (MBR) on the target point, wherein the MBR is selected to represent a name corresponding to the target point;

(b) determining whether the MBR is overlapped with at least one of a plurality of previously assigned MBRs;

(c) locating the MBR and a current position of the MBR and placing the name of the MBR if the MBR is not overlapped with any of the previously assigned MBRs;

(d) determining whether it is possible to continuously shift the MBR around the target point to locate the MBR on one of a plurality of shifted positions not overlapped with any of the previously assigned MBRs if the MBR is overlapped with at least one of the previously assigned MBRs;

(e) locating the MBR on the one of said plurality of shifted positions not overlapped with any of the previously assigned MBRs and placing the name on the MBR; and (f) assigning another point feature located on a new predetermined uppermost position from the remaining point-features as the target point and repeating the steps (a) to (e) until all of the point features contained on the map are processed.

\* \* \* \* \*